(12) United States Patent
Matsuki et al.

(10) Patent No.: US 10,044,901 B2
(45) Date of Patent: Aug. 7, 2018

(54) IMAGE FORMING SYSTEM THAT IDENTIFIES WHO HAS PERFORMED PRINTING

(71) Applicant: Kyocera Document Solutions Inc., Osaka (JP)

(72) Inventors: Yoshitaka Matsuki, Osaka (JP); Tomohiro Kawasaki, Osaka (JP); Kunihiko Shimamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/884,403

(22) Filed: Jan. 31, 2018

(65) Prior Publication Data

US 2018/0176410 A1    Jun. 21, 2018

Related U.S. Application Data

(62) Division of application No. 15/137,019, filed on Apr. 25, 2016, now Pat. No. 9,917,976.

(30) Foreign Application Priority Data

Apr. 25, 2015   (JP) .................... 2015-089898

(51) Int. Cl.
   *H04N 1/00*    (2006.01)
   *G06F 3/12*    (2006.01)
   (Continued)

(52) U.S. Cl.
   CPC ..... *H04N 1/32133* (2013.01); *H04N 1/00244* (2013.01); *H04N 1/00307* (2013.01);
   (Continued)

(58) Field of Classification Search
   None
   See application file for complete search history.

(56) References Cited

U.S. PATENT DOCUMENTS 5,342,034 A * 8/1994 Mandel .................. B42C 1/125
                                              109/56
9,258,452 B1    2/2016 Eschbach et al.
(Continued)

FOREIGN PATENT DOCUMENTS

JP        2012-029164 A    2/2012

*Primary Examiner* — Beniyam Menberu
(74) *Attorney, Agent, or Firm* — James Judge

(57) ABSTRACT

An image forming system includes a portable terminal device, an image forming apparatus, and a marker registration circuit. A display device in the image forming apparatus displays a marker associated with location information of a user who has instructed execution of printing on a recording medium. The portable terminal device includes an information acquisition circuit and a position notification image output circuit. The information acquisition circuit photographs the marker displayed on the display device using an imaging device, so as to acquire the location information registered in the marker registration circuit, and the location information is associated with the marker photographed by the imaging device. The position notification image output circuit outputs a position notification image that notifies an output device of a position corresponding to the location information acquired by the information acquisition circuit.

4 Claims, 21 Drawing Sheets

(51) Int. Cl.
*G06F 3/14* (2006.01)
*G06K 15/02* (2006.01)
*H04N 1/32* (2006.01)

(52) U.S. Cl.
CPC . *H04N 1/32352* (2013.01); *H04N 2201/0094* (2013.01); *H04N 2201/3204* (2013.01); *H04N 2201/328* (2013.01)

(56) References Cited

U.S. PATENT DOCUMENTS

| | | |
|---|---|---|
| 2002/0130185 A1 | 9/2002 | LaForge et al. |
| 2003/0104820 A1* | 6/2003 | Greene ............ H04W 4/02 455/456.1 |
| 2003/0120555 A1* | 6/2003 | Kitagawa ........ G01C 21/3623 705/26.1 |
| 2004/0088259 A1* | 5/2004 | Celik ............... G06Q 10/10 705/50 |
| 2006/0065733 A1 | 3/2006 | Lee et al. |
| 2007/0195364 A1 | 8/2007 | Umehara et al. |
| 2012/0223968 A1 | 9/2012 | Kashimoto |

* cited by examiner

FIG. 8

| User ID | Location Information |  |
|---|---|---|
| USER001 | North Latitude 35.67⋯, East Longitude 139.44⋯ | ⋯ |
| ⋮ | ⋮ | ⋯ |

44d

IMAGE FORMING SYSTEM THAT IDENTIFIES WHO HAS PERFORMED PRINTING

CROSS-REFERENCE TO RELATED APPLICATIONS

This is a divisional of application Ser. No. 15/137,019, having a filing date of Apr. 25, 2016.

INCORPORATION BY REFERENCE

Application Ser. No. 15/137,019 claims the benefit of foreign priority from corresponding Japanese Patent Application No. 2015-089898, filed in the Japanese Patent Office on Apr. 25, 2015 and the entire contents of which are incorporated herein by reference.

BACKGROUND

Unless otherwise indicated herein, the description in this section is not prior art to the claims in this application and is not admitted to be prior art by inclusion in this section.

There is known a typical image forming system that combines a state of the image forming apparatus with a position corresponding to the image forming apparatus in a photographed image.

SUMMARY

An image forming system according to one aspect of the disclosure includes a portable terminal device, an image forming apparatus, and a marker registration circuit. The portable terminal device includes an imaging device and an output device. The image forming apparatus performs printing on a recording medium. The marker registration circuit registers a marker. A display device in the image forming apparatus displays the marker associated with location information of a user who has instructed execution of printing on the recording medium. The marker registration circuit registers the location information associated with the marker. The portable terminal device includes an information acquisition circuit and a position notification image output circuit. The information acquisition circuit photographs the marker displayed on the display device using the imaging device, so as to acquire the location information registered in the marker registration circuit, and the location information is associated with the marker photographed by the imaging device. The position notification image output circuit outputs a position notification image that notifies the output device of a position corresponding to the location information acquired by the information acquisition circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8 illustrates a schematic diagram of exemplary desk position information according to the one embodiment.

DETAILED DESCRIPTION

Figure 1:
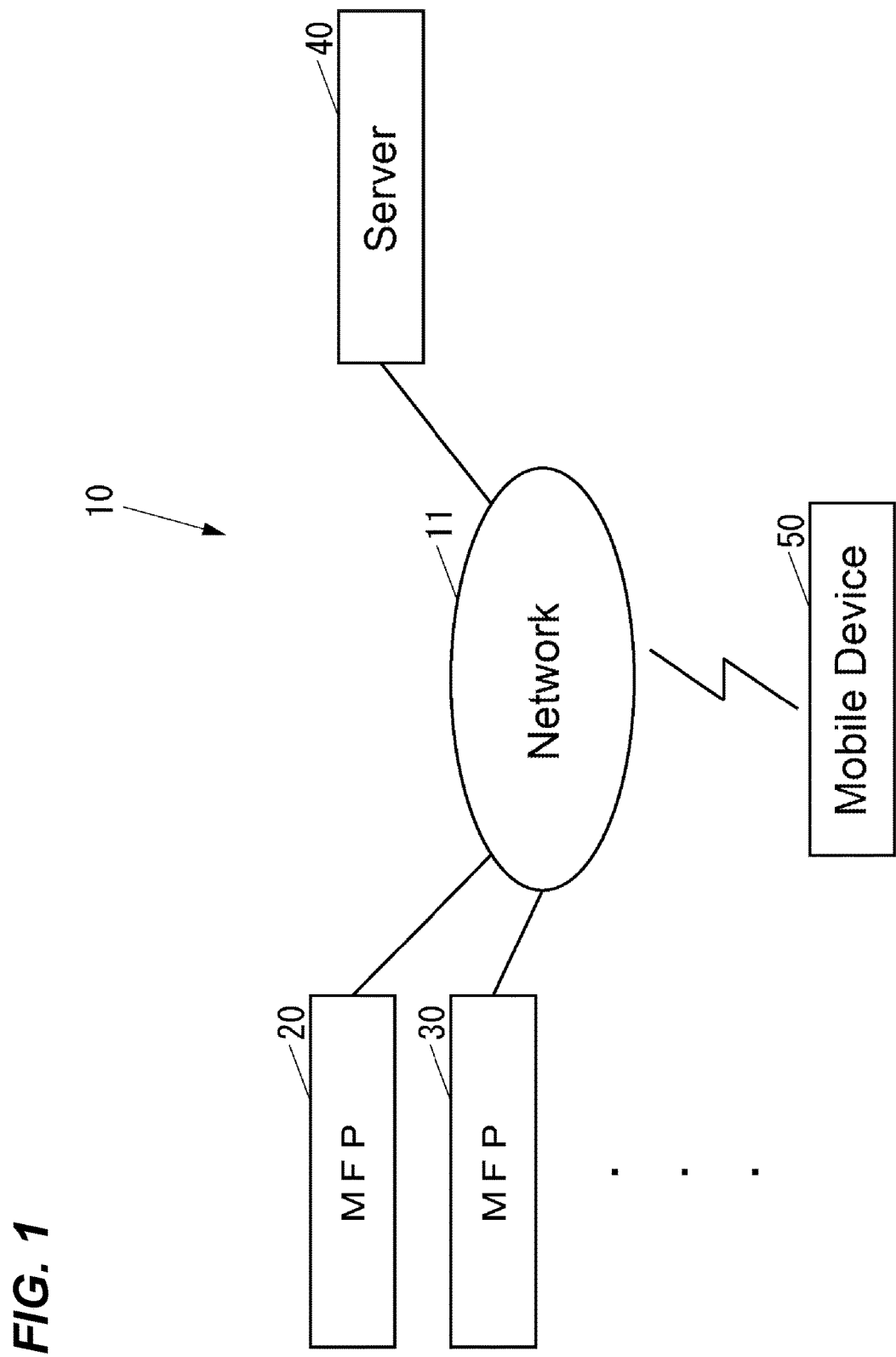
FIG. 1 illustrates a schematic diagram of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, the following describes a configuration of an image forming system according to the embodiment.

FIG. 1 illustrates a block diagram of an image forming system 10 according to the embodiment.

As illustrated in FIG. 1, the image forming system 10 includes a plurality of multifunction peripherals (MFPs) including MFPs 20 and 30, a server 40, such as a personal computer (PC), and a mobile device 50, such as a smart phone, a tablet, and a small-sized personal computer. The server 40 manages the plurality of the MFPs. The plurality of the MFPs in the image forming system 10, the server 40, and the mobile device 50 are communicatively connected to one another via a network 11, such as a local area network (LAN) or an Internet. The mobile device 50 constitutes a portable terminal device of the disclosure.

The plurality of the MFPs in the image forming system 10 each have a configuration similar to a configuration of the MFP 20 or the MFP 30. The following describes the MFP 20 and the MFP 30 for representing the plurality of the MFPs in the image forming system 10 accordingly.

Figure 2:
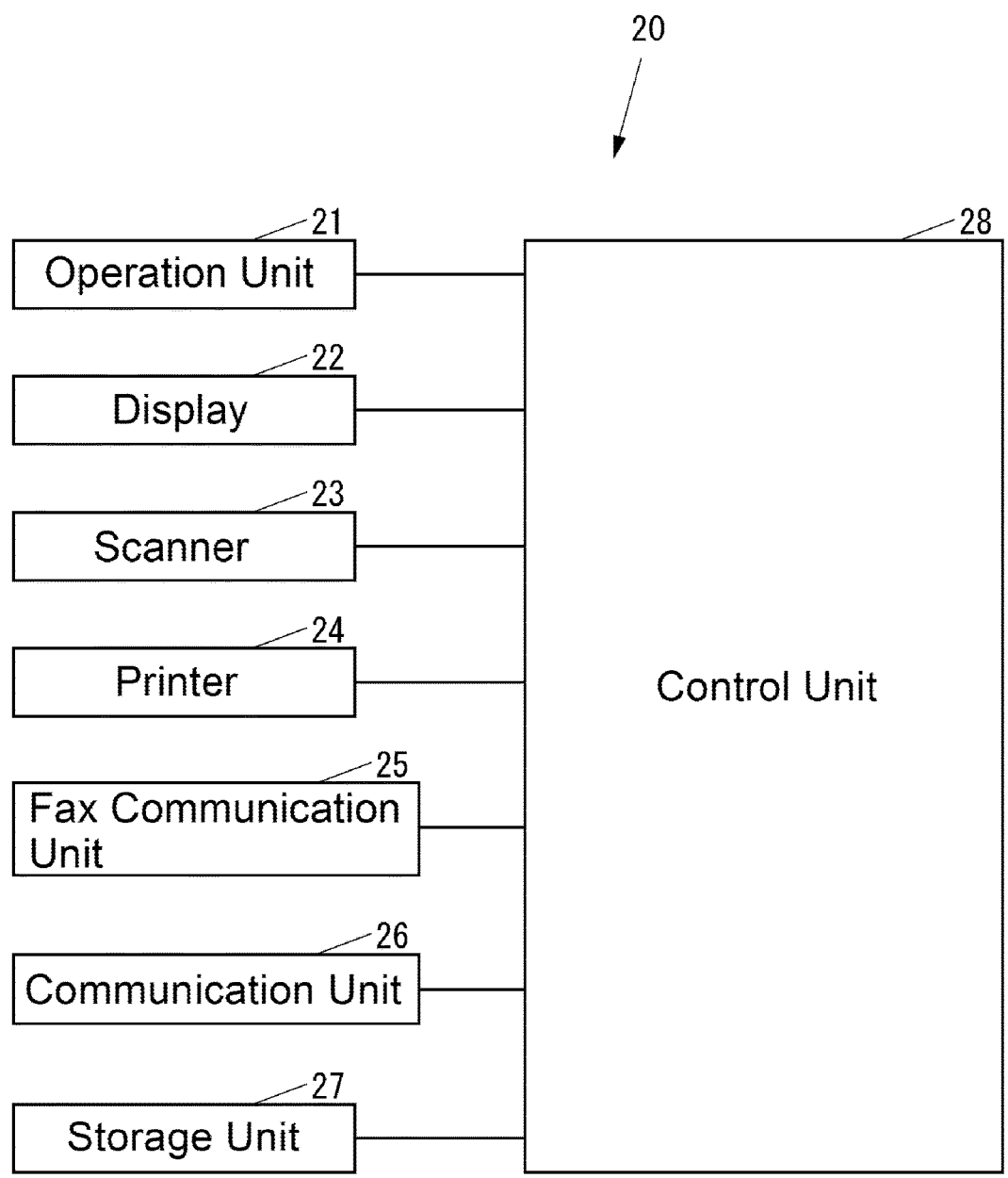
FIG. 2 illustrates a functional block configuration of an MFP according to the one embodiment.

FIG. 2 illustrates a block diagram of the MFP 20.

The MFP 20 includes an operation unit 21, a display 22, a scanner 23, a printer 24, a fax communication unit 25, a communication unit 26, a storage unit 27, and a control unit 28 as illustrated in FIG. 2. The operation unit 21 is an input device such as a button, with which a user inputs various operations. The display 22 is a display device such as a liquid crystal display (LCD), which displays various pieces of information. The scanner 23 is a reading device that reads an image from a document. The printer 24 is a print device that performs printing on a recording medium such as a paper sheet. The fax communication unit 25 is a fax device that performs fax communications with an external facsimile device (not illustrated) via a communication line such as a dial-up line. The communication unit 26 is a communication device that communicates with an external device via the network 11 (see FIG. 1). The storage unit 27 is a non-volatile storage device, which stores various data, such as an electrically erasable programmable read-only memory (EEPROM) or a hard disk drive (HDD). The control unit 28 controls the entire MFP 20.

The control unit 28 includes, for example, a central processing unit (CPU), a read-only memory (ROM), which stores programs and various data, and a random-access memory (RAM), which is used as a work area of the CPU. The CPU ensures execution of programs stored in the ROM or the storage unit 27.

Figure 3:
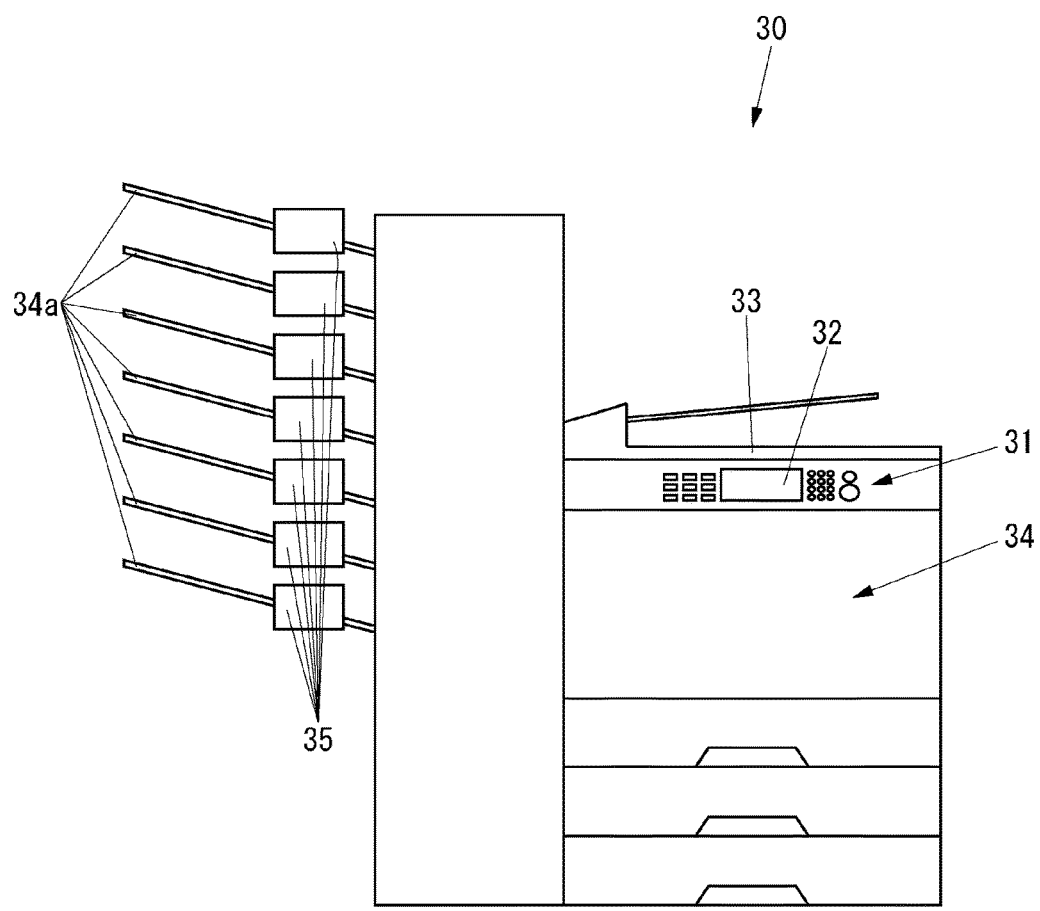
FIG. 3 illustrates a schematic diagram of a configuration of an MFP illustrated in FIG. 1, which is different from the MFP illustrated in FIG. 2.
Figure 4:
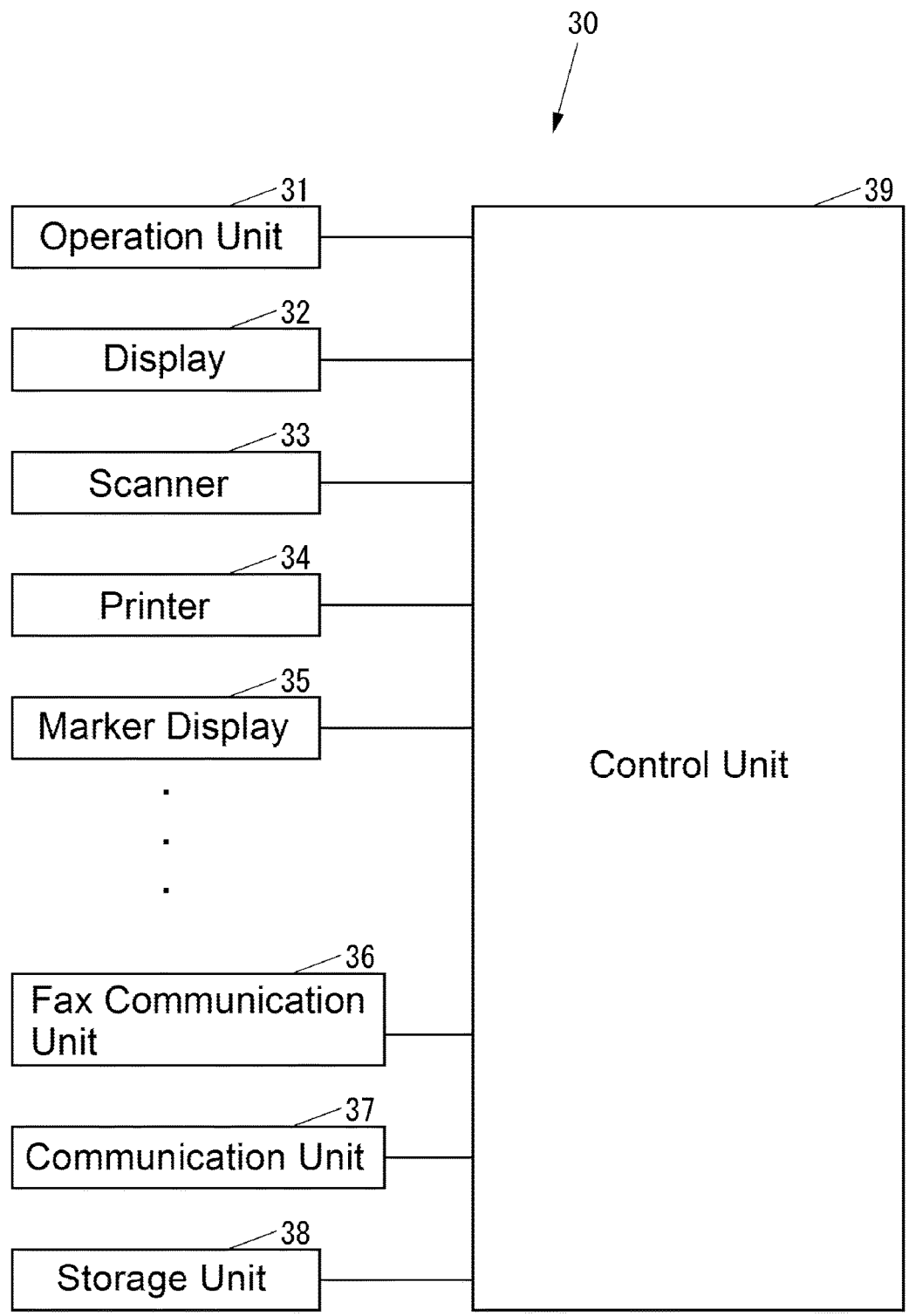
FIG. 4 illustrates a functional block configuration of the MFP according to the one embodiment.

FIG. 3 schematically illustrates the configuration of the MFP 30. FIG. 4 illustrates a block diagram of the MFP 30.

The MFP 30 includes an operation unit 31, a display 32, a scanner 33, and a printer 34 as illustrated in FIGS. 3 and 4. The operation unit 31 is an input device such as a button, with which the user inputs various operations. The display 32 is a display device such as an LCD that displays various pieces of information. The scanner 33 is a reading device that reads an image from a document. The printer 34 is a print device that performs printing on a recording medium such as a paper sheet.

Here, the printer 34 includes a plurality of discharge units 34a that discharges a printed recording medium.

The MFP 30 includes a plurality of marker displays 35, a fax communication unit 36, a communication unit 37, a storage unit 38, and a control unit 39. The marker display 35 is a display device such as the LCD, which is located corresponding to the discharge unit 34a. The fax communication unit 36 is a fax device that performs fax communications with an external facsimile device (not illustrated) via a communication line such as a dial-up line. The communication unit 37 is a communication device that communicates with an external device via the network 11 (see FIG. 1). The storage unit 38 is a non-volatile storage device such as an EEPROM or an HDD, which stores various data. The control unit 39 controls the entire MFP 30.

The control unit 39 includes, for example, a CPU, a ROM, which stores programs and various data, and a RAM, which is used as a work area of the CPU. The CPU ensures execution of programs stored in the ROM or the storage unit 38.

Figure 5:
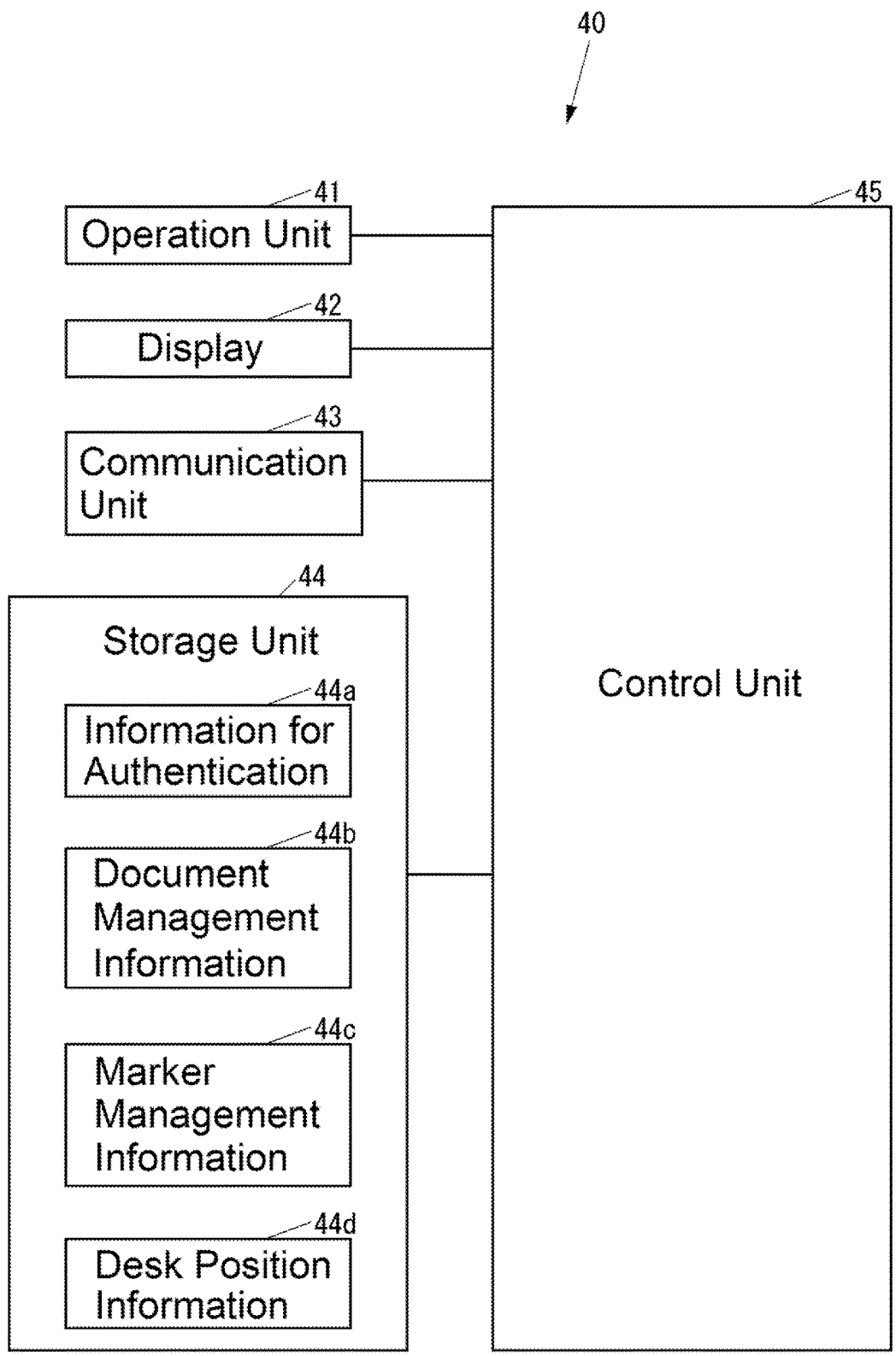
FIG. 5 illustrates a functional block configuration of a server according to the one embodiment.

FIG. 5 illustrates a block diagram of the server 40.

The server 40 includes an operation unit 41, a display 42, a communication unit 43, a storage unit 44, and a control unit 45 as illustrated in FIG. 5. The operation unit 41 is an input device such as a computer mouse or a keyboard, with which a user inputs various operations. The display 42 is a display device such as an LCD that displays various pieces of information. The communication unit 43 is a communication device that communicates with an external device via the network 11 (see FIG. 1). The storage unit 44 is a non-volatile storage device such as an HDD that stores various data. The control unit 45 controls the entire server 40.

The storage unit 44 stores information for authentication 44a, such as a combination of a user ID and a password, for authenticating the user.

The storage unit 44 stores document management information 44b for managing a document printed by the MFP in the image forming system 10.

The storage unit 44 stores marker management information 44c for managing a marker associated with identification information of the user. Namely, the server 40 constitutes a marker registration unit (also referred to as a marker registration circuit) that registers the marker.

The storage unit 44 stores desk position information 44d for managing location information of the user.

The control unit 45 includes, for example, a CPU, a ROM, which stores programs and various data, and a RAM, which is used as a work area of the CPU. The CPU executes programs stored in the ROM or the storage unit 44.

Figure 6:
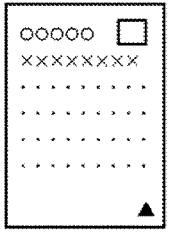
FIG. 6 illustrates a schematic diagram of exemplary document management information according to the one embodiment.

FIG. 6 illustrates exemplary document management information 44b.

The document management information 44b associates at least, for example, a job ID, which is identification information of a print job, the user ID, which is one aspect of the identification information of the user who has instructed execution of the printing, and a document image as a print job target, that is, a thumbnail of an image printed on the recording medium one another and includes the pieces of the associated information as illustrated in FIG. 6.

Figure 7:
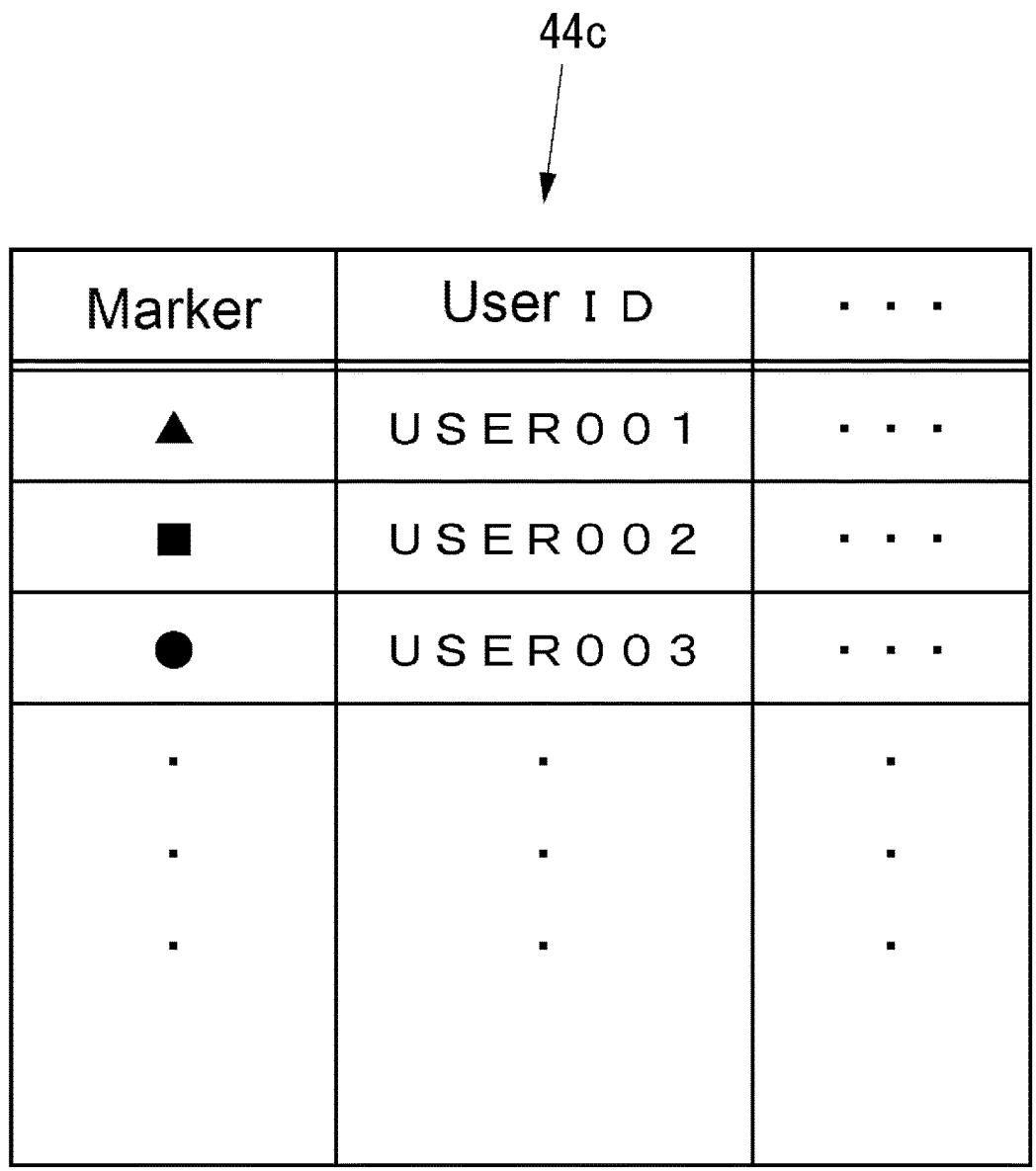
FIG. 7 illustrates a schematic diagram of exemplary marker management information according to the one embodiment.

FIG. 7 illustrates exemplary marker management information 44c.

The marker management information 44c associates at least, for example, the marker and the user ID of the user who has instructed the execution of the printing one another and includes the associated information as illustrated in FIG. 7.

FIG. 8 illustrates exemplary desk position information 44d.

The desk position information 44d associates at least, for example, the user ID of the user and the location information of the user one another and includes the associated information as illustrated in FIG. 8.

The server 40 associates the user ID and the thumbnail of the image one another to register the associated information in the document management information 44b illustrated in FIG. 6 and associates the marker and the user ID of the user one another to register the associated information in the marker management information 44c illustrated in FIG. 7. Namely, the server 40 associates the marker and the thumbnail of the image one another corresponding to a combination of the document management information 44b and the marker management information 44c to register the associated information.

The server 40 associates the marker and the user ID of the user one another to register the associated information in the marker management information 44c illustrated in FIG. 7 and associates the user ID of the user and the location information of the user one another to register the associated information in the desk position information 44d illustrated in FIG. 8. Namely, the server 40 associates the marker and the location information of the user one another corresponding to a combination of the marker management information 44c and the desk position information 44d to register the associated information.

Figure 9:
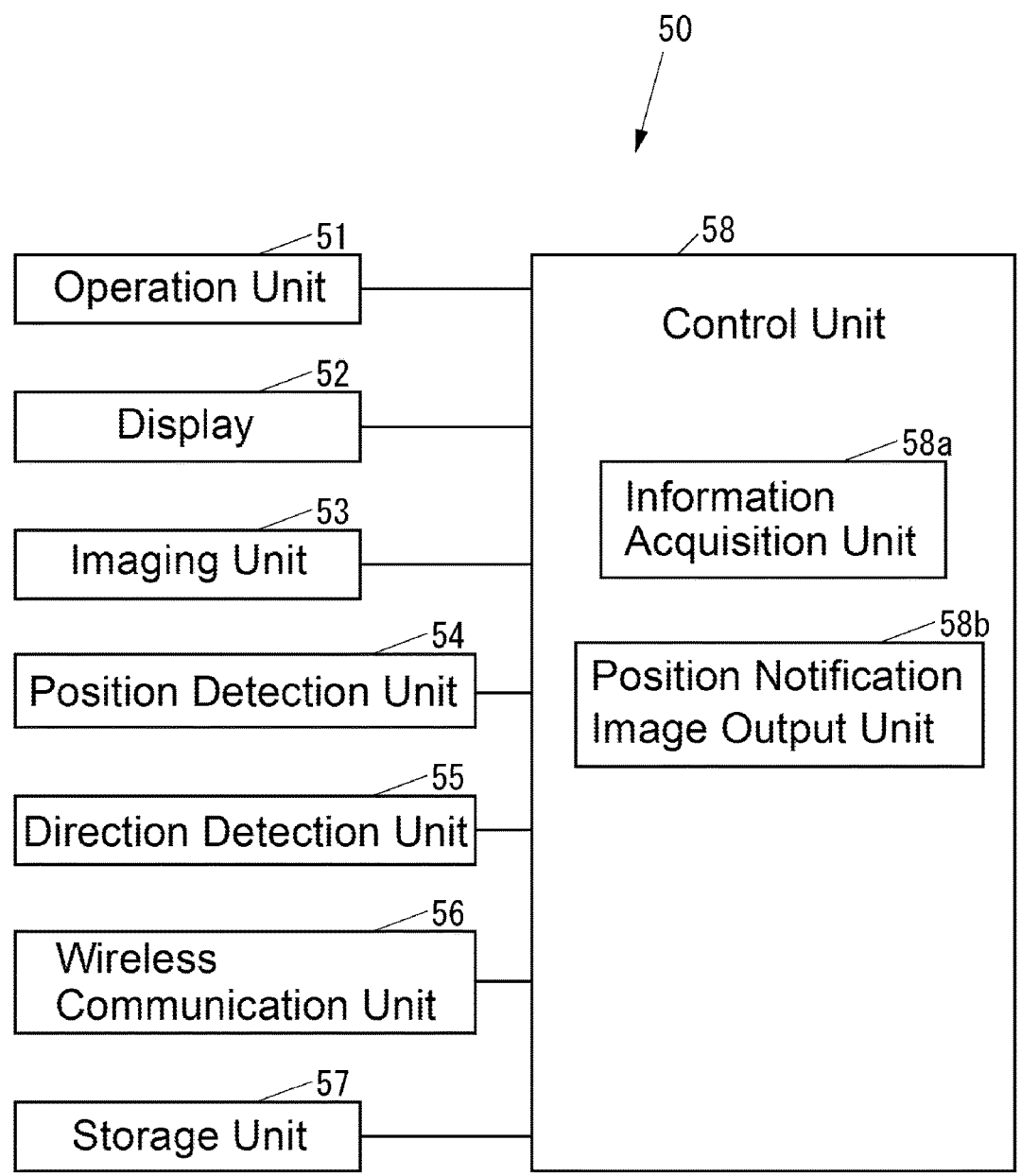
FIG. 9 illustrates a block configuration of a mobile device according to the one embodiment.

FIG. 9 illustrates a block diagram of the mobile device 50.

The mobile device 50 includes an operation unit 51, a display 52, an imaging unit 53, a position detection unit 54, a direction detection unit 55, a wireless communication unit 56, a storage unit 57, and a control unit 58 as illustrated in FIG. 9. The operation unit 51 is an input device such as a button, to which various operations are input. The display 52 is a display device such as an LCD, which displays various pieces of information. The imaging unit 53 is an imaging device. The position detection unit 54 is a position detection device such as a Global Positioning System (GPS) receiver that detects a present location in an actual space of the mobile device 50. The direction detection unit 55 is a direction detection device such as an acceleration sensor that detects a present direction in the actual space of the mobile device 50. The wireless communication unit 56 is a communication device that communicates with an external device via the network 11 (see FIG. 1) using wireless communication. The storage unit 57 is a non-volatile storage device such as an HDD that stores programs and various data. The control unit 58 controls the entire mobile device 50.

The operation unit 51 includes an input device that constitutes a touch panel along with the display 52.

The control unit 58 includes, for example, a CPU, a ROM, which stores programs and various data, and a RAM, which is used as a work area of the CPU. The CPU ensures execution of programs stored in the ROM or the storage unit 57.

The execution of the programs stored in the ROM or the storage unit 57 causes the control unit 58 to function as an information acquisition unit 58a and a position notification image output unit 58b. The information acquisition unit 58a acquires the location information and the user ID, which are associated with the marker photographed by the imaging unit 53 and registered in the server 40 (see FIG. 5). The position notification image output unit 58b outputs a position notification image, which notifies a position corresponding to the location information acquired by the information acquisition unit 58a, to the display 52. The information acquisition unit 58a is also referred to as an information acquisition circuit. The position notification image output unit 58b is also referred to as a position notification image output circuit.

Next, the following describes an operation of the image forming system 10.

First, the following describes an operation of the MFP 20 when print data is received.

Figure 10:
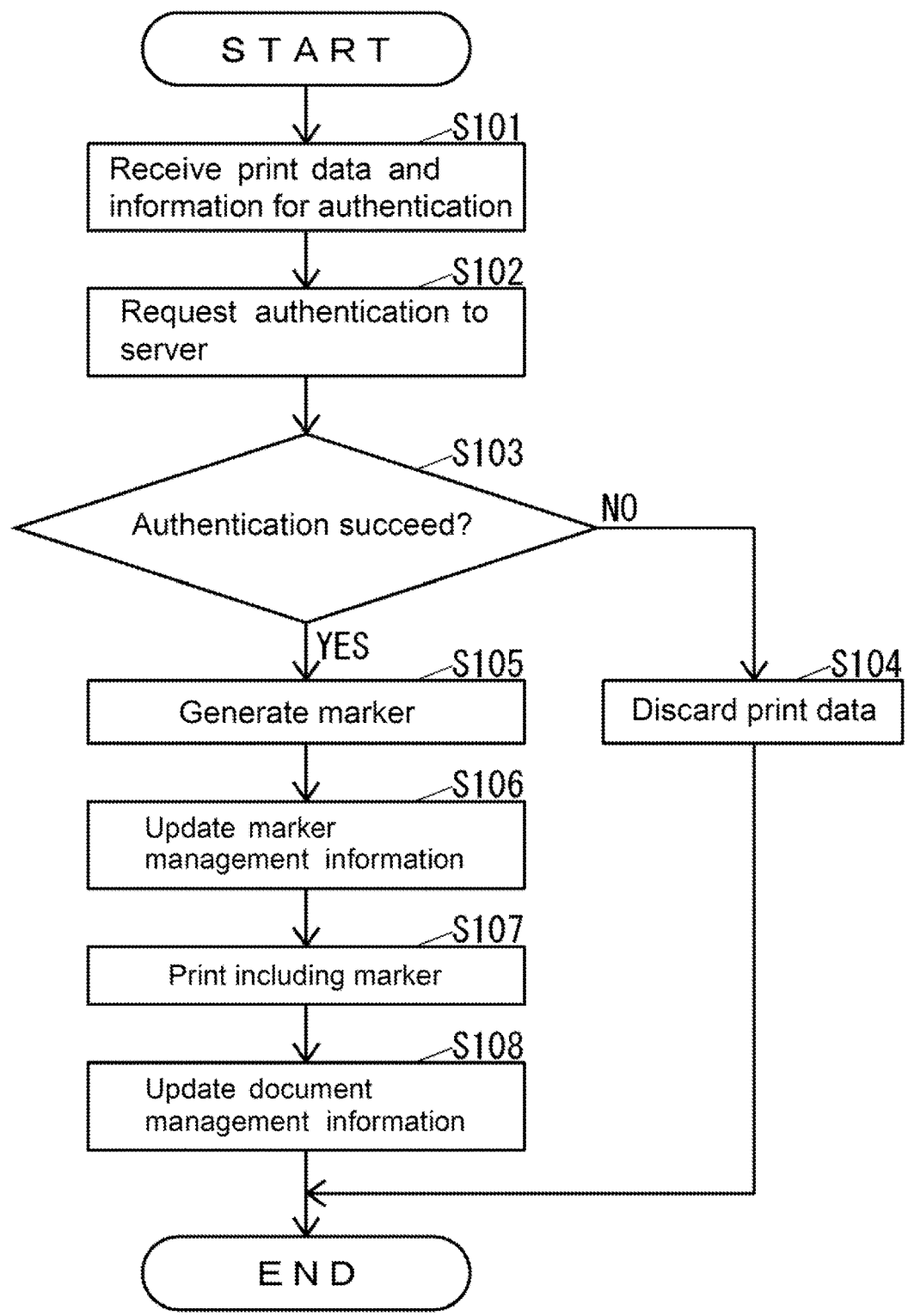
FIG. 10 illustrates a flowchart of an operation of the MFP according to the one embodiment when print data is received.

FIG. 10 illustrates the operation of the MFP 20 when print data is received.

When the user transmits the print data from a computer (not illustrated) to the MFP 20, the MFP 20 performs the operation illustrated in FIG. 10.

The control unit 28 in the MFP 20 receives the transmitted print data and transmitted information for authentication of the user associated with this print data via the communication unit 26 as illustrated in FIG. 10 (see S101).

Next, the control unit 28 requests user authentication to the server 40 by transmitting the information for authentication received in S101 to the server 40 via the communication unit 26 (see S102).

Here, the control unit 45 in the server 40 performs the user authentication based on the received information for authentication when receiving the transmitted information for authentication from the MFP 20 via the communication unit 43. Specifically, the control unit 45 determines that the user authentication has succeeded when the information for the authentication 44a in the storage unit 44 includes the received information for authentication. The control unit 45 determines that the user authentication has failed when the information for the authentication 44a in the storage unit 44 does not include the received information for authentication. Then, the control unit 45 replies a result of the authentication to the MFP 20 via the communication unit 43.

When the control unit 28 receives the result of the authentication transmitted from the server 40 via the communication unit 26 after the process S102, the control unit 28 determines whether or not the received result shows a success (see S103).

When, in S103, the control unit 28 determines that the authentication has not succeeded, that is, the authentication has failed, the control unit 28 terminates the operation illustrated in FIG. 10 after discarding the print data received in S101 (see S104).

When, in S103, the control unit 28 determines that the authentication has succeeded, the control unit 28 generates a marker (see S105). For example, the control unit 28 may generate a figure or a character as the marker, or may employ at least a part of printing contents instructed from the user as the marker.

Next, the control unit 28 transmits the user ID as the information for authentication received in S101 and the marker generated in S105 to the server 40. This causes the server 40 to update the marker management information 44c.

After that, the control unit 28 performs printing including the marker generated in S105 based on the print data received in S101 (see S107).

Figure 11:
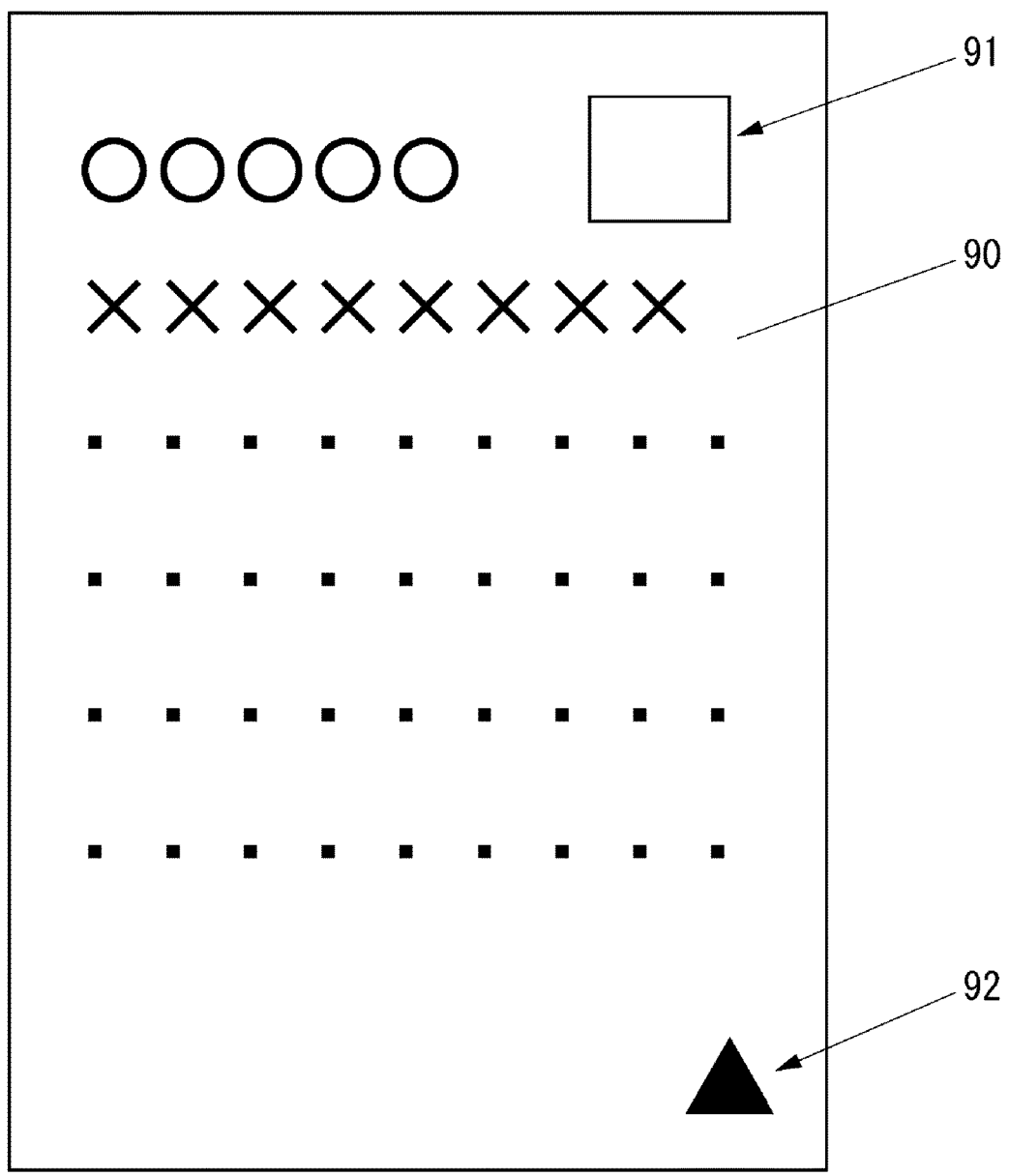
FIG. 11 illustrates a schematic diagram of an exemplary recording medium on which a marker is printed by the operation illustrated in FIG. 10.

For example, as illustrated in FIG. 11, when the printer 34 prints an image 91 based on the print data received in S101 on a recording medium 90, the control unit 28 may cause the printer 34 to additionally print the marker 92 generated in S105 on the recording medium 90. Here, when the printer 34 prints on a plurality of the recording mediums 90, the control unit 28 may cause the marker 92 to be printed on all the recording mediums 90, or may cause the marker 92 to be printed on only a specific recording medium 90, for example, the first sheet among the plurality of the recording mediums 90.

Figure 12:
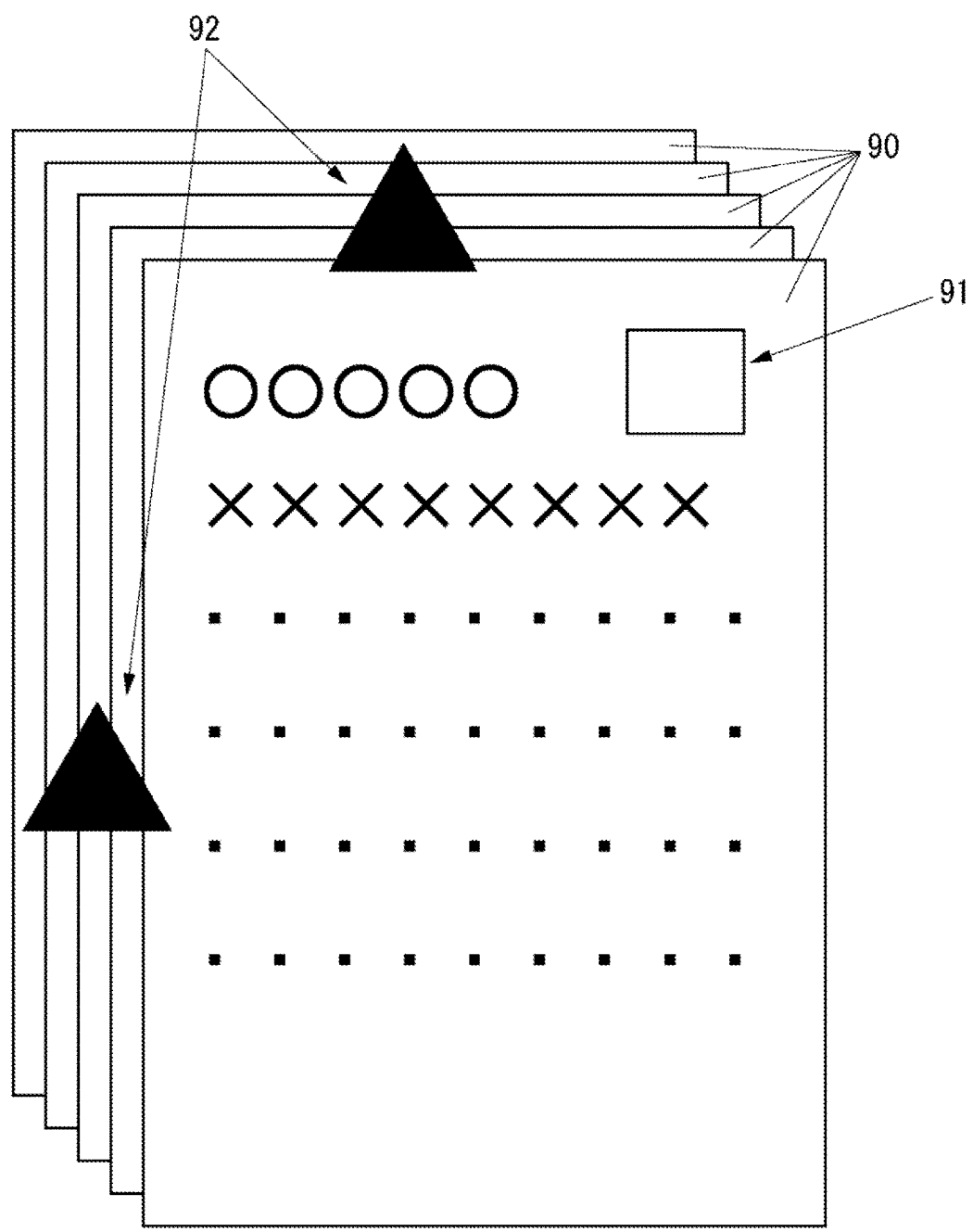
FIG. 12 illustrates a schematic diagram of an exemplary recording medium on which markers are printed by the operation illustrated in FIG. 10, which is an example different from the example illustrated in FIG. 11.

As illustrated in FIG. 12, when the printer 34 prints the image 91 based on the print data received in S101 on the plurality of the recording mediums 90, the control unit 28 may cause one marker 92 to be printed across the plurality of the recording mediums 90 and may cause the plurality of recording mediums 90 to be displaced in a state where the marker 92 printed across the plurality of the recording mediums 90 appears and to be discharged to a discharge unit 34a. When the printer 34 prints the marker 92 across the plurality of the recording mediums 90 and prints the marker 92 across two or more recording mediums 90 among the plurality of the recording mediums 90, the control unit 28 does not have to cause the marker 92 to be printed across all the plurality of the recording mediums 90.

As illustrated in FIG. 10, the control unit 28 transmits a job ID of the present print job based on the print data received in S101, the user ID in the information for authentication received in S101, and the document image as the print job target, that is, the image 91 based on the print data received in S101, to the server 40 after the process S107. This causes the server 40 to update the document management information 44b (see S108) for terminating the operation illustrated in FIG. 10.

Figure 13:
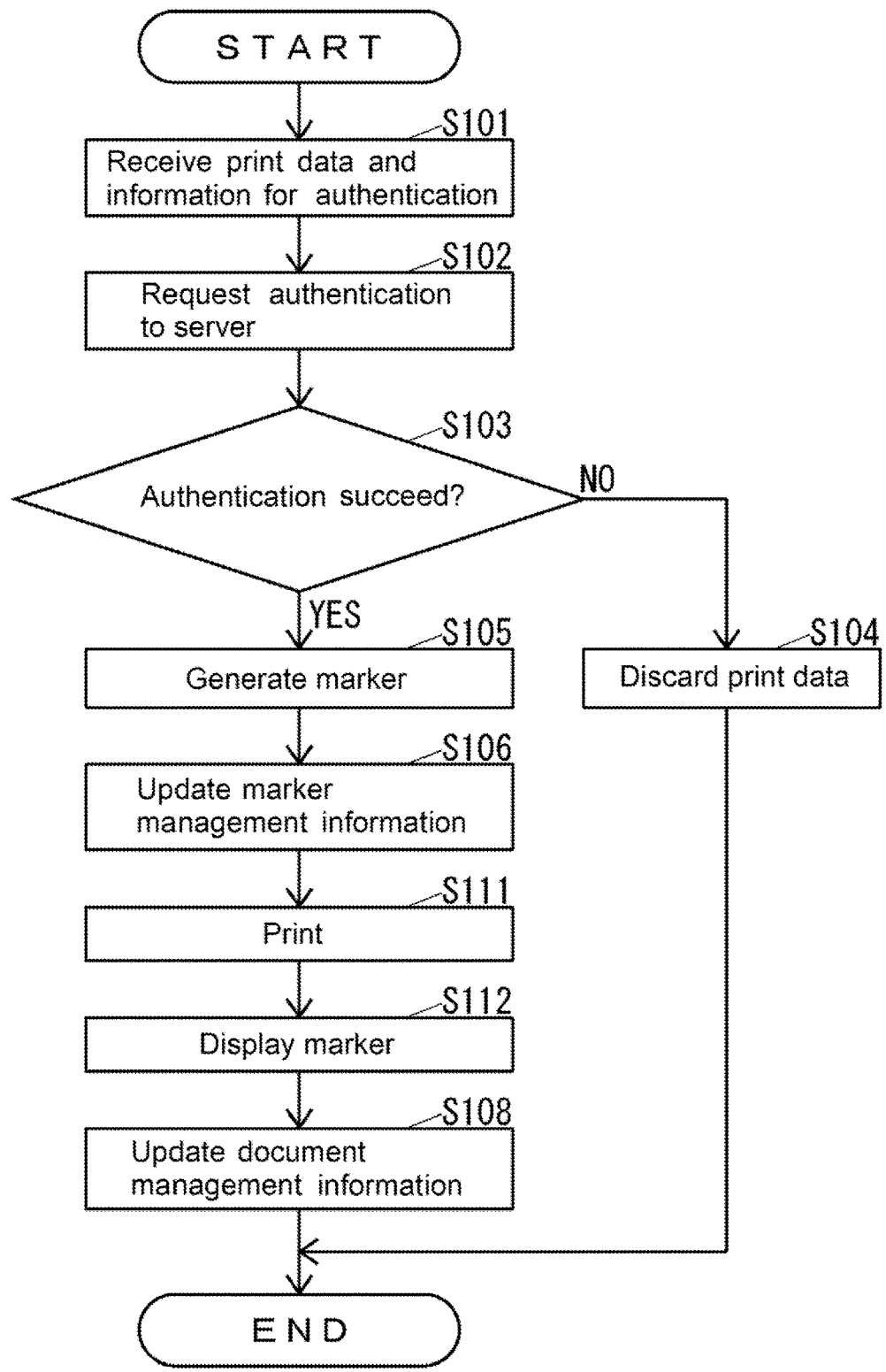
FIG. 13 illustrates a flowchart of an operation of the MFP according to the one embodiment when print data is received.

FIG. 13 illustrates an operation of the MFP 30 when print data is received.

After the user transmits the print data to the MFP 30 from the computer (not illustrated), the MFP 30 performs the operation illustrated in FIG. 13.

The control unit 39 in the MFP 30 performs the processes S101 to S106, similarly to the operation illustrated in FIG. 10, as illustrated in FIG. 13.

The control unit 39 performs the printing based on the print data received in S101 after the process S106 (see S111). Here, the control unit 39 determines a discharge unit 34a, to which a printed recording medium is discharged, corresponding to the user who has instructed execution of the printing on the recording medium, that is, the user ID as the information for the authentication 44a received in S101.

Figure 14:
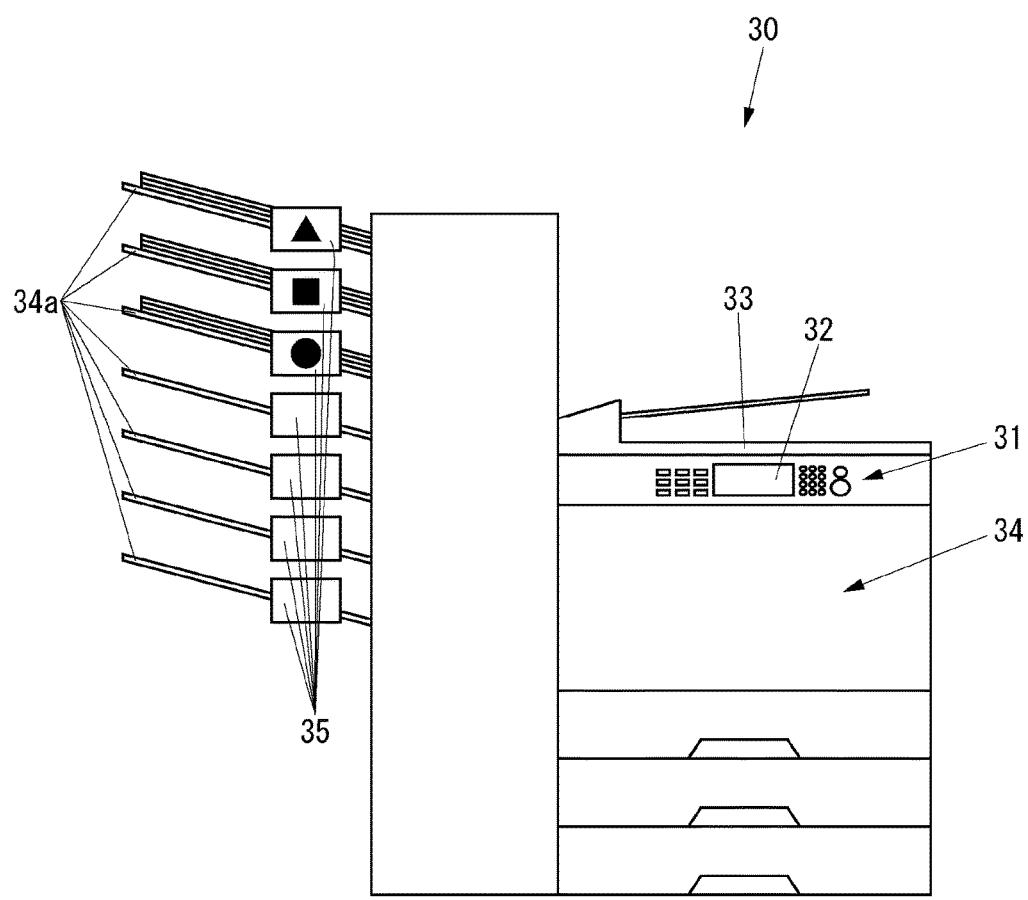
FIG. 14 illustrates a schematic diagram of an exemplary marker display on which a marker is displayed by the operation illustrated in FIG. 13.

For example, after the process S111, the control unit 39 displays the marker generated in S105 on the marker display 35 located corresponding to the discharge unit 34a, to which the recording medium is discharged in S111, as illustrated in FIG. 14 (see S112).

After the process S112, the control unit 39 performs the process S108, similarly to the operation illustrated in FIG. 10, to terminate the operation illustrated in FIG. 13.

Next, the following describes an operation of the mobile device 50 when the marker is photographed.

Figure 15:
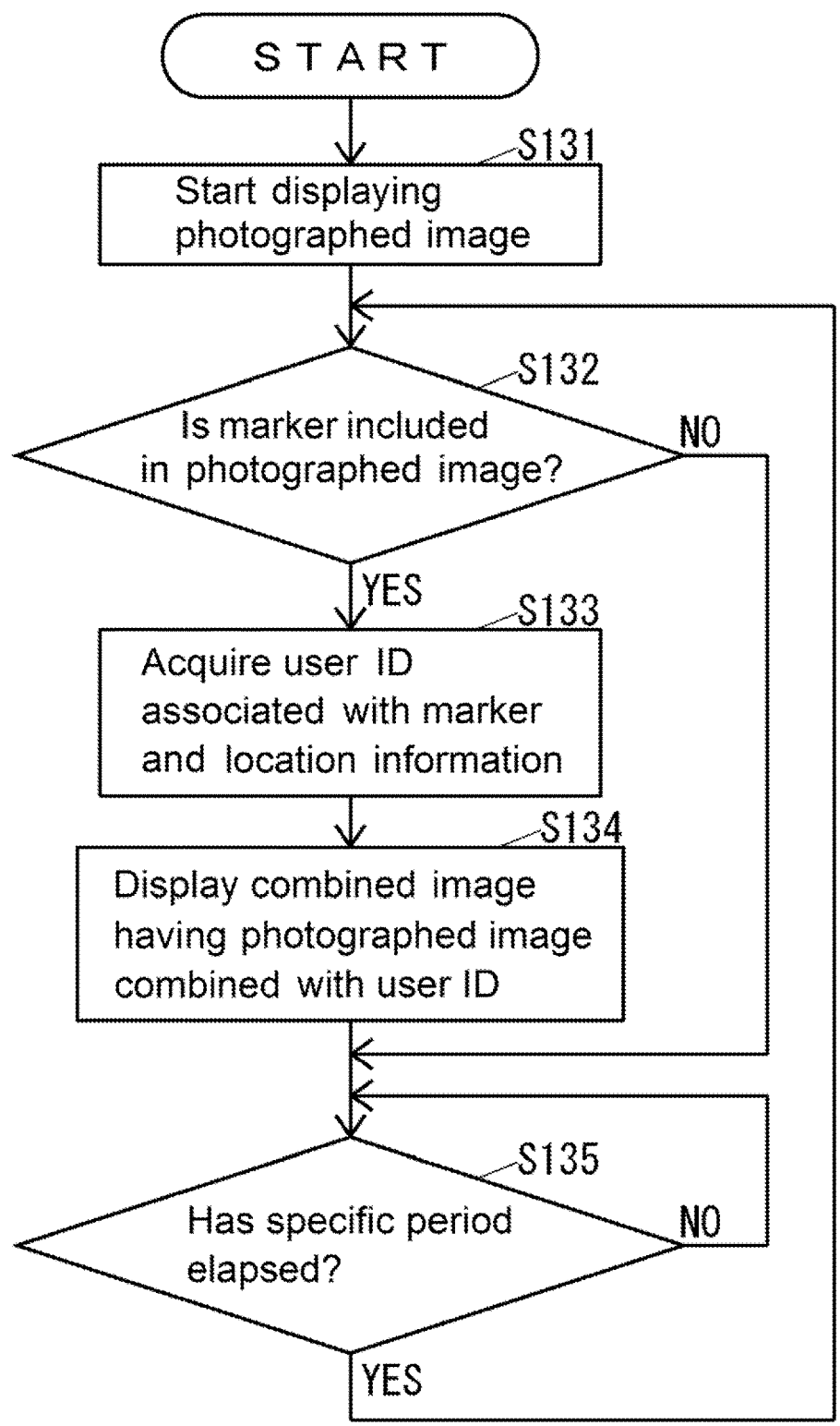
FIG. 15 illustrates a flowchart of an operation of the mobile device according to the one embodiment when a marker is photographed.

FIG. 15 illustrates the operation of the mobile device 50 when the marker is photographed.

The information acquisition unit 58a in the mobile device 50 starts to display a photographed image photographed by the imaging unit 53 on the display 52 as illustrated in FIG. 15 (see S131).

Next, the information acquisition unit 58a determines whether or not the photographed image photographed by the imaging unit 53 includes the marker (see S132). Here, the user of the mobile device 50 causes the imaging unit 53 to photograph the marker 92 printed on the recording medium 90 illustrated in FIG. 11 or FIG. 12 to be included in the photographed image photographed by the imaging unit 53. Similarly, the user of the mobile device 50 causes the imaging unit 53 to photograph the marker displayed on the marker display 35 illustrated in FIG. 14 to be included in the photographed image photographed by the imaging unit 53.

When, in S132, the information acquisition unit 58a determines that the photographed image photographed by the imaging unit 53 includes the marker, the information acquisition unit 58a acquires the user ID, which is associated with the marker included in the photographed image to be registered in the marker management information 44c in the server 40, and the location information, which is associated with this user ID to be registered in the desk position information 44d in the server 40 (see S133).

Then, the information acquisition unit 58a cause the display 52 to display a combined image combined with the user ID obtained in S133 at a position corresponding to the marker in the photographed image photographed by the imaging unit 53 (see S134).

Figure 16:
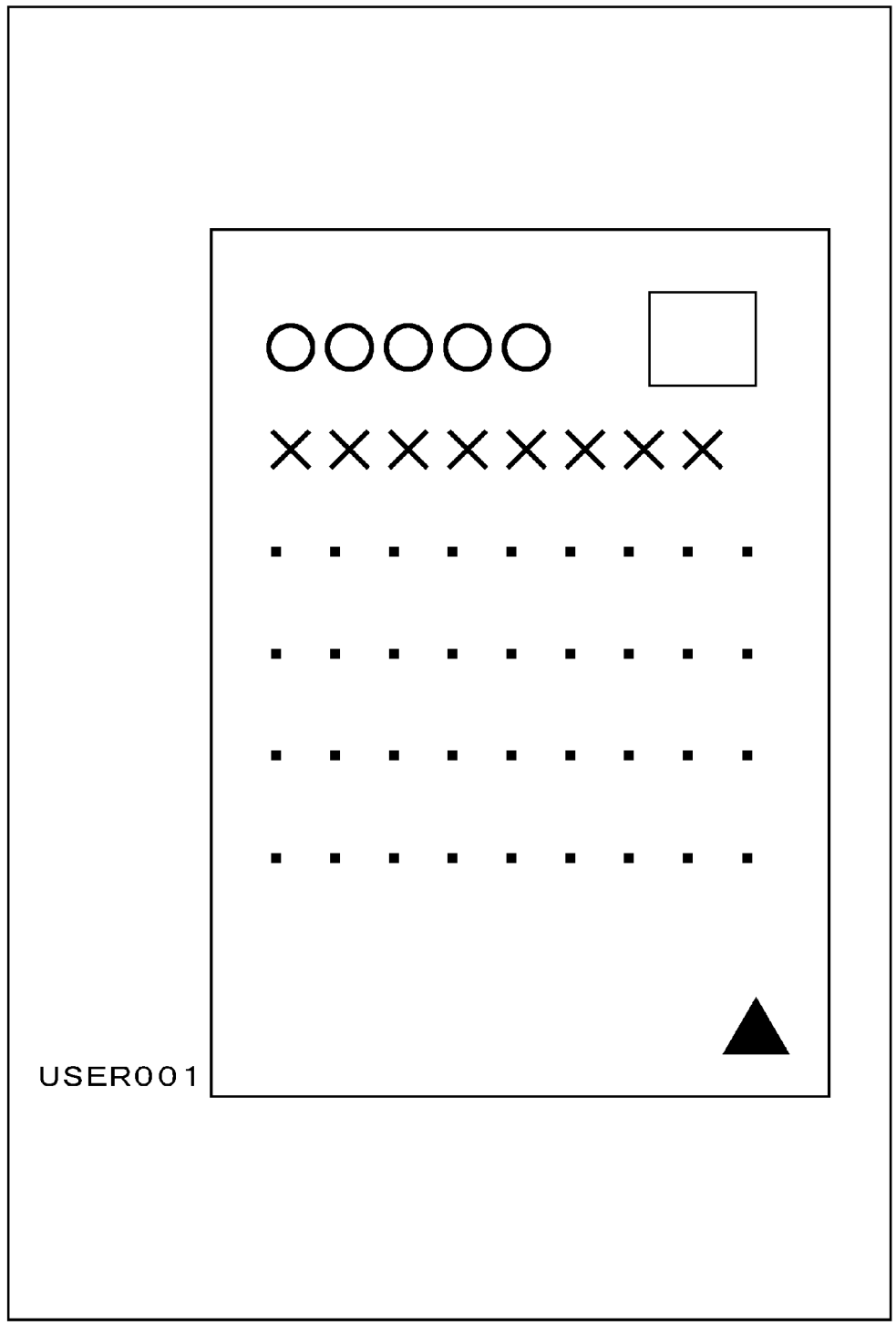
FIG. 16 illustrates a schematic diagram of an exemplary image displayed on a display when the marker illustrated in FIG. 11 is photographed.

For example, when the user of the mobile device 50 causes the imaging unit 53 to photograph the marker 92 printed on the recording medium 90 illustrated in FIG. 11, the information acquisition unit 58a causes the display 52 to display a combined image combined with "USER 001" as the user ID obtained in S133 as illustrated in FIG. 16.

Figure 17:
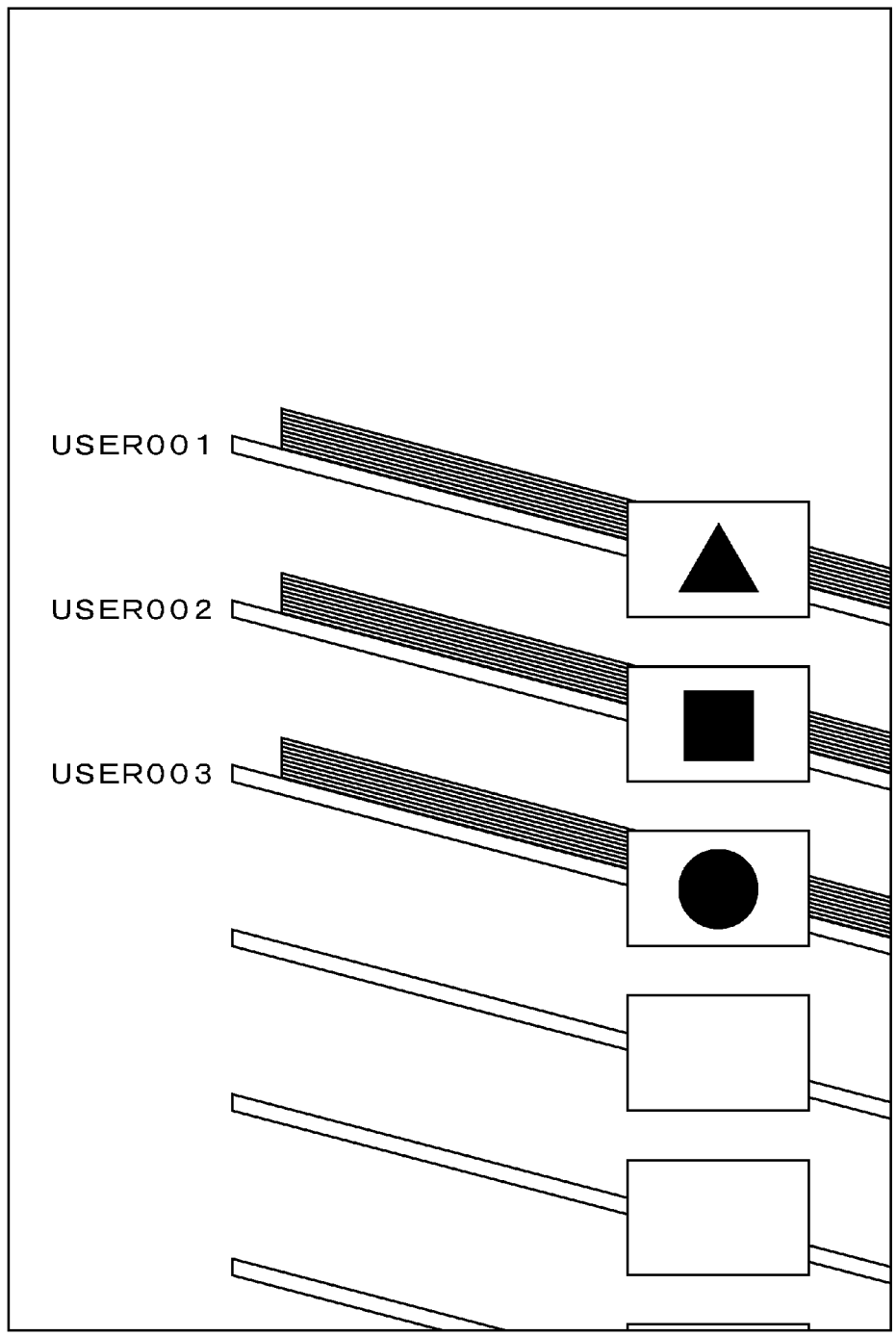
FIG. 17 illustrates a schematic diagram of an exemplary image displayed on the display when the marker illustrated in FIG. 14 is photographed.

When the user of the mobile device 50 causes the imaging unit 53 to photograph the marker displayed on the marker display 35 illustrated in FIG. 14, the information acquisition unit 58a causes the display 52 to display a combined image combined with "USER 001," "USER 002," and "USER 003," which are user IDs obtained in S133, as illustrated in FIG. 17.

As illustrated in FIG. 15, when, in S132, the information acquisition unit 58a determines that the photographed image photographed by the imaging unit 53 does not include the marker or when, in S135, the information acquisition unit 58a determines that a specific period elapses after the execution of the process S134, the information acquisition unit 58a performs the process S132.

Next, the following describes an operation of the mobile device 50 when notifying a position of the user who has instructed the execution of the printing.

Figure 18:
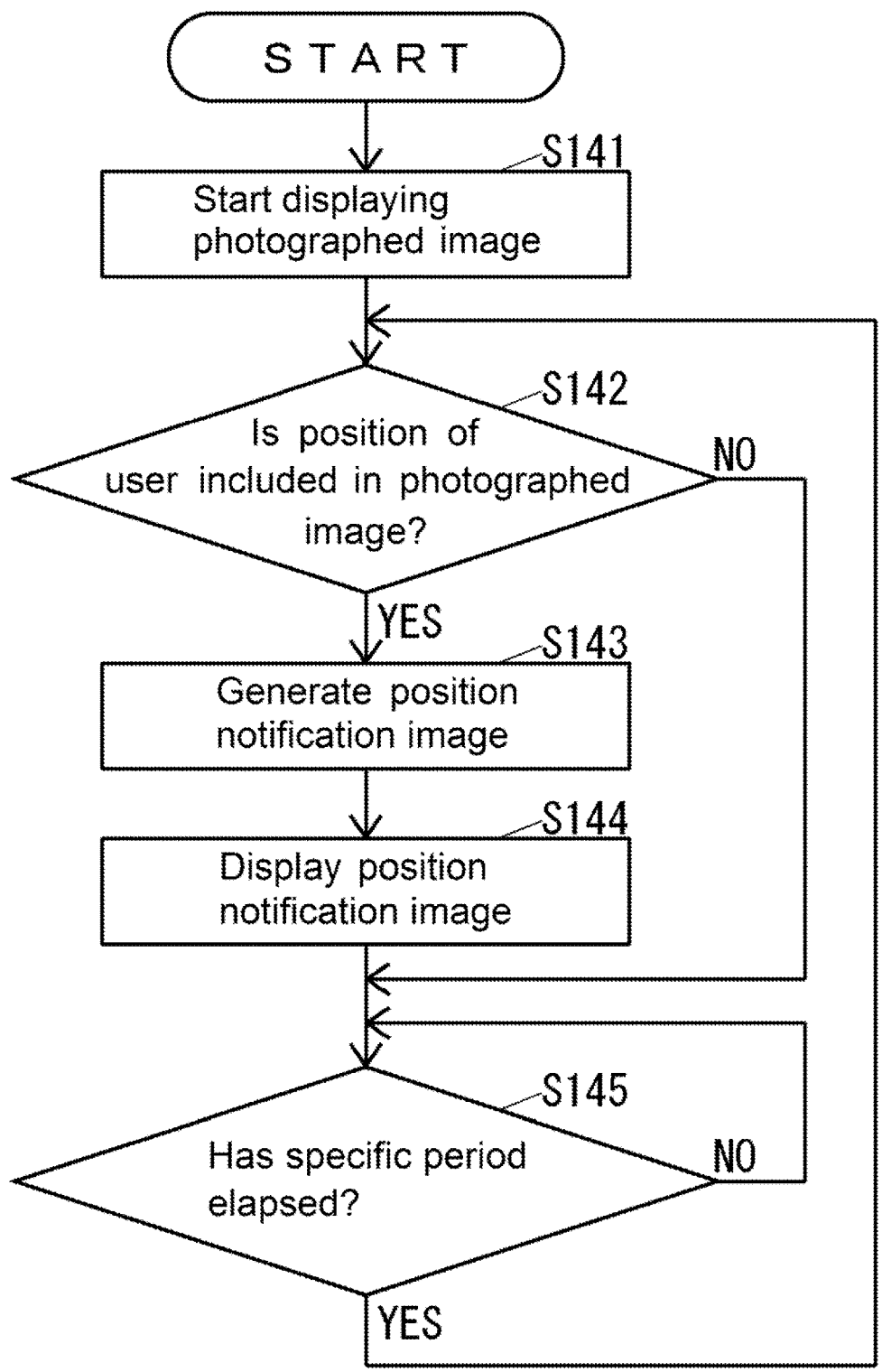
FIG. 18 illustrates a flowchart of an operation of the mobile device according to the one embodiment when notifying a position of a user who has instructed execution of printing.

FIG. 18 illustrates the operation of the mobile device 50 when notifying the position of the user who has instructed the execution of the printing.

When the mobile device 50 causes the display 52 to display a combined image, which combines the photographed image photographed by the imaging unit 53 with the user ID, and is instructed, via the operation unit 51, to notify the position of the user with the user ID assigned to the user who causes the display 52 to display the combined image, the mobile device 50 performs the operation illustrated in FIG. 18.

The position notification image output unit 58b in the mobile device 50 starts to display the photographed image photographed by the imaging unit 53 on the display 52 as illustrated in FIG. 18 (see S141).

Next, the position notification image output unit 58b determines whether or not the photographed image photographed by the imaging unit 53 includes the position of the user who has instructed the execution of the printing based on a position of the mobile device 50 detected by the position detection unit 54, a photographing direction of the imaging unit 53 based on a direction detected by the direction detection unit 55, and the location information acquired in S133 (see S142).

When, in S142, the position notification image output unit 58b determines that the photographed image includes the position of the user who has instructed the execution of the printing, the position notification image output unit 58b combines the photographed image with a position instruction image that instructs a position corresponding to the location information acquired in S133, so as to generate a position notification image (see S143).

Figure 19A:
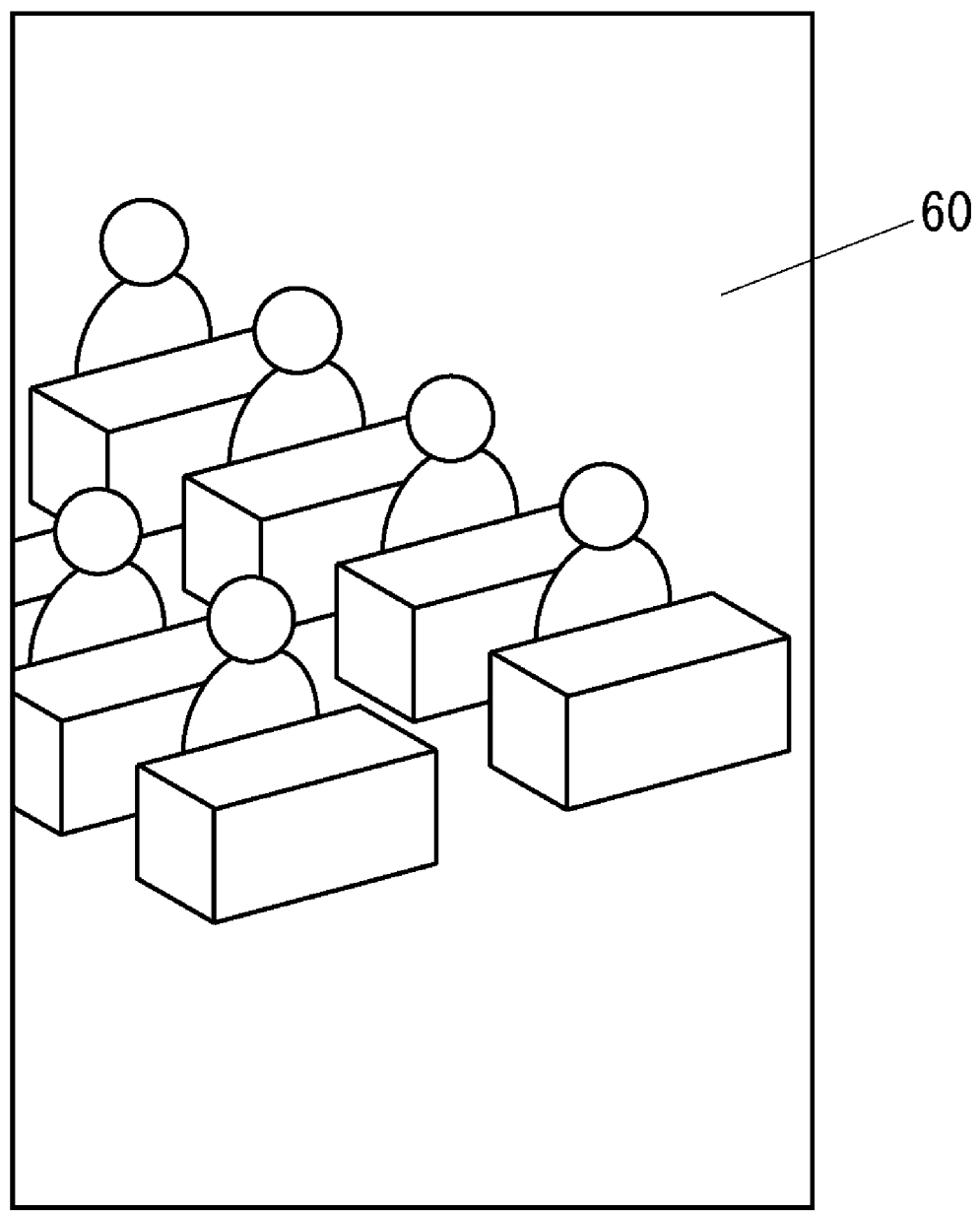
FIG. 19A illustrates a schematic diagram of an exemplary image of an actual desk position photographed by an imaging unit according to the one embodiment.
Figure 19B:
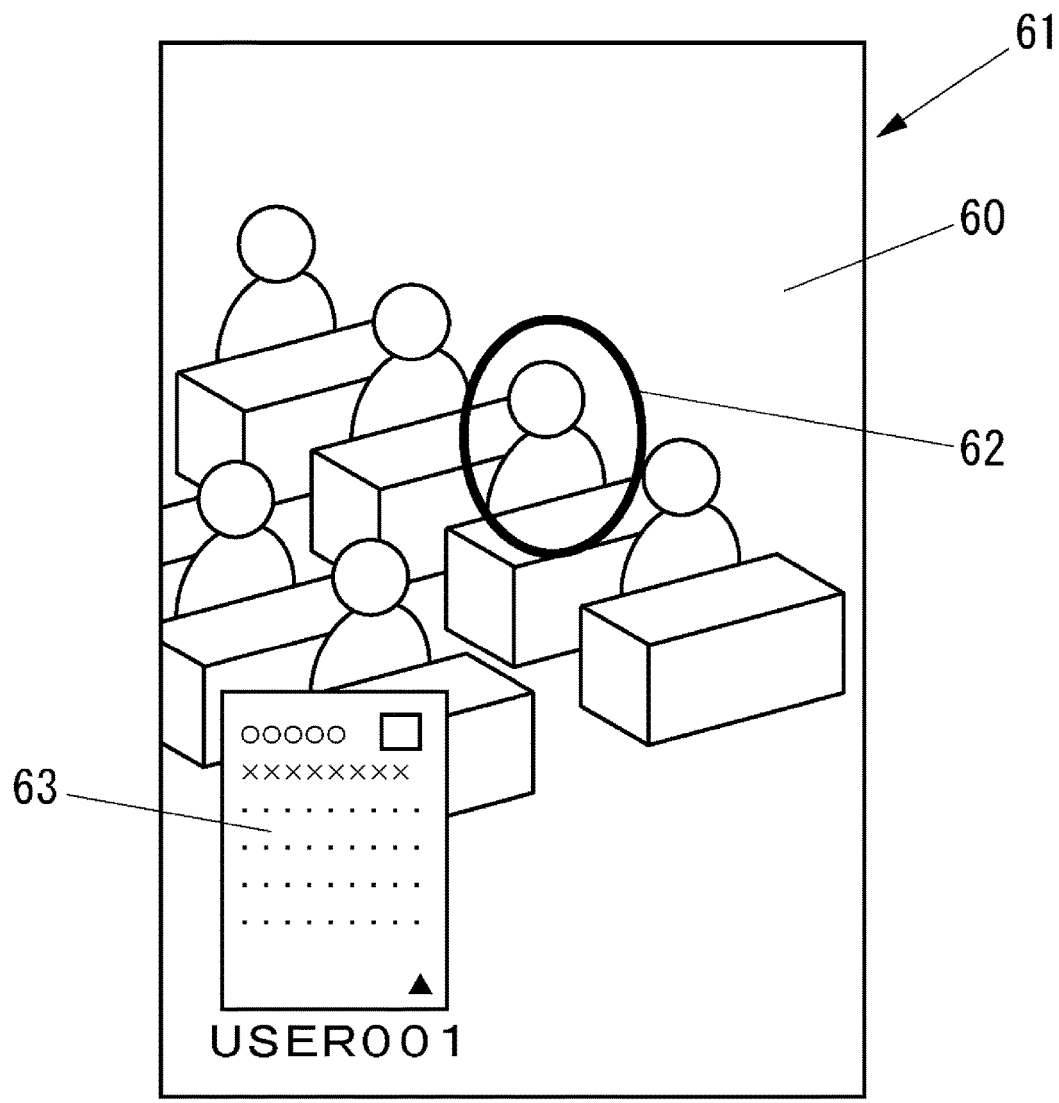
FIG. 19B illustrates a schematic diagram of an exemplary position notification image generated based on the image illustrated in FIG. 19A.

FIG. 19A illustrates an exemplary image of an actual desk position photographed by the imaging unit 53. FIG. 19B illustrates an exemplary position notification image that is generated based on the image illustrated in FIG. 19A.

As illustrated in FIGS. 19A to 19B, a position notification image 61 is a combined image, which combines: a photographed image 60 of an actual desk position with a position instruction image 62 that instructs the position of the user who has instructed the execution of the printing, a thumbnail 63 of a printed image, and the user ID of the user who has instructed the execution of the printing.

The position notification image output unit 58b causes the display 52 to display the position notification image generated in S143 after the process S143 as illustrated in FIG. 18 (see S144).

When, in S142, the position notification image output unit 58b determines that the photographed image does not include the position of the user who has instructed the execution of the printing, or when, in S145, the position notification image output unit 58b determines that a specific period has elapsed after the execution of the process S144, the position notification image output unit 58b performs the process S142.

As described above, the image forming system 10 prints the marker associated with the location information of the user on the recording medium (see S107) to output the position notification image, which notifies the position corresponding to the location information of the user associated with the marker photographed by the imaging unit 53, to the display 52 (see S144). This ensures identification of the position of the user who has instructed the execution of the printing after the printing.

Additionally, the image forming system 10 prints the marker associated with the user ID of the user on the recording medium (see S107) to output the user ID, which is associated with the marker photographed by the imaging unit 53, to the display 52 (see S134 and S144). This ensures identification of the user who has instructed the execution of the printing after the printing.

When the image forming system 10 prints the marker, which is associated with the user ID and the location information of the user, on the recording medium and has a configuration where at least a part of printing contents instructed from the user is employed as the marker, the image forming system 10 does not need to print a dedicated marker on the recording medium. This prevents a reduction of visibility of original printing contents of the recording medium due to the dedicated marker.

When the image forming system 10 prints the marker associated with the user ID on the recording medium, additionally prints one marker 92 across the plurality of the recording medium 90 as illustrated in FIG. 12, and even original printing contents of the recording medium 90 has little margin, the image forming system 10 identifies the user who has instructed the execution of the printing based on a dedicated marker 92 after the printing.

The image forming system 10 displays the marker, which is associated with the location information of the user, on the marker display 35 located corresponding to the discharge unit 34a, to which a printed recording medium is discharged, (see S112) to output the position notification image, which notifies the position corresponding to the location information of the user associated with the marker photographed by the imaging unit 53, to the display 52 (see S144). This ensures identification of the position of the user who has instructed the execution of the printing after the printing.

Additionally, the image forming system 10 displays the marker, which is associated with the user ID, on the marker display 35 located corresponding to the discharge unit 34a, to which a printed recording medium is discharged, (see S112) to output the user ID, which is associated with the marker photographed by the imaging unit 53, to the display 52 (see S134 and S144). This ensures identification of the user who has instructed the execution of the printing after the printing.

When the image forming system 10 displays the marker associated with the user ID on the marker display 35, the image forming system 10 determines the discharge unit 34a, to which a printed recording medium is to be discharged, corresponding to the user who has instructed the execution of the printing on the recording medium. This ensures identification of the user using the discharge unit 34a, to which a printed recording medium has been discharged.

The image forming system 10 displays a combined image, which combines the position corresponding to the marker in the photograph image with the user ID (see S134). Thus, even when the photographed image includes a plurality of the markers, the image forming system 10 identifies the users respectively associated with the plurality of the markers.

Figure 20:
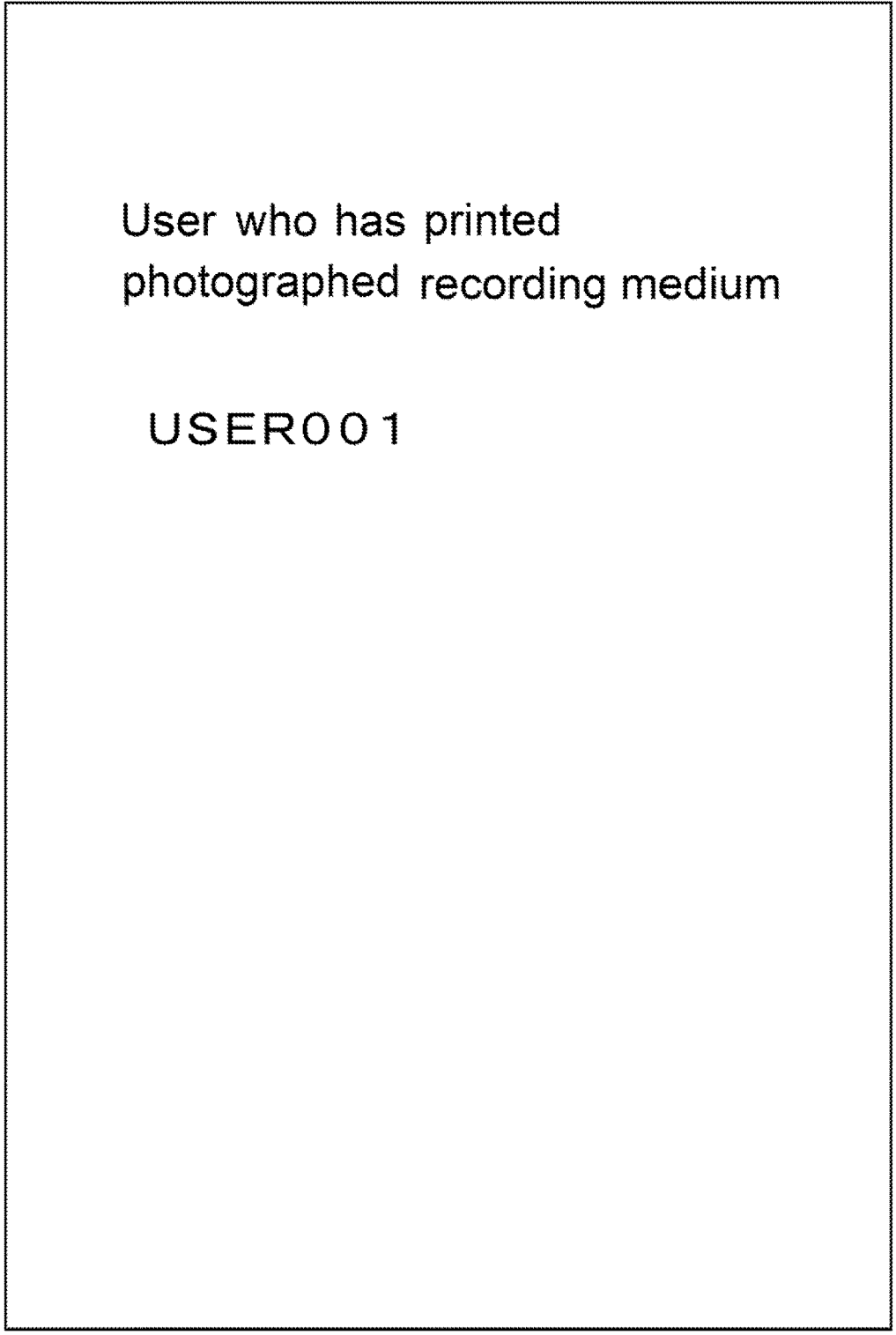
FIG. 20 illustrates a schematic diagram of an exemplary image displayed on the display when the marker illustrated in FIG. 11 is photographed, which is an example different from the example illustrated in FIG. 16.

When the image forming system 10 has a configuration where the image forming system 10 outputs the user ID, which is associated with the marker included in the photographed image photographed by the imaging unit 53, to the display 52, this eliminates the need for an AR (augmented reality) technique. For example, when the user of the mobile device 50 causes the imaging unit 53 to photograph the marker 92 printed on the recording medium 90 illustrated in FIG. 11, the position notification image output unit 58b in the mobile device 50 may display "USER 001" as the user ID obtained in S133 on the display 52 as illustrated in FIG. 20.

When the image forming system 10 uses an image of the recording medium photographed by the imaging unit 53 as the thumbnail 63 included in the position notification image 61, the image forming system 10 displays the position of the user who has instructed the execution of the printing and a printed image of the recording medium in one position notification image 61. This ensures the reduced possibility for causing a pass mistake when the printed recording medium is passed to the user who has instructed the execution of the printing.

The image forming system 10 does not necessarily to employ the image of the recording medium photographed by the imaging unit 53 as the thumbnail 63 of the position notification image 61, and may employ a thumbnail associated with the marker photographed by the imaging unit 53 and registered in the document management information 44b in the server 40, as the thumbnail 63 of the position notification image 61. Even in this configuration, the image forming system 10 causes the position of the user who has instructed the execution of the printing and a thumbnail of the printed recording medium to be included in one position notification image. This ensures the reduced possibility for causing the pass mistake when the printed recording medium is passed to the user who has instructed the execution of the printing.

The image forming system 10 combines the photographed image with the position instruction image to facilitate search of the user who has instructed the execution of the printing.

The image forming system 10 does not necessarily to combine the position instruction image with the photographed image, and the image forming system 10 may cause the display 52 to display a combined image, which combines a preliminarily prepared desk-position table with the position instruction image. In this case, location information of the desk position information 44d may be any information that indicates a position in the desk position table.

The image forming system 10 displays not only the position of the user who has instructed the execution of the printing but also the user ID of the user who has instructed the execution of the printing in the one position notification image (see S144). This ensures appropriate identification of the user who has instructed the execution of the printing.

While the image forming system 10 displays the user ID, which is one aspect of the identification information of the user, on the display 52 as described above, the image forming system 10 may display identification information other than the user ID on the display 52. For example, the image forming system 10 may display a user name, which is one aspect of the identification information of the user, on the display 52. When the image forming system 10 displays the user name, which is one aspect of the identification information of the user, on the display 52, the user name may be identified by using the user ID and the user information when the display 52 displays the user name, assuming that, for example, the server 40 stores user information, which associates: the user ID, which is one aspect of the identification information of the user; and the user name, which is one aspect of the identification information of the user.

As described above, while the image forming system 10 generates the marker at every process of FIG. 10 or FIG. 13 (see S105), the image forming system 10 does not need to generate the marker each time when using a specific marker for each user.

Even when the user forgets to take a recording medium, on which the MFP has performed the printing based on print data received from an outside, from a discharge unit of the MFP, the image forming system 10 ensures the identification of the user who has instructed the execution of printing and the position of this user with simple operation after the printing. Additionally, even when the MFP does not perform the printing based on the print data received from the outside, the image forming system 10 ensures the identification of the user who has instructed the execution of the printing and the position of this user after the printing. For example, even when a printer prints an image read by a scanner, that is, in a case of copying, the image forming system 10 ensures the identification of the user who has instructed the execution of the copying and the position of this user after the printing using a mechanism similar to a mechanism in the case of the printing performed by the MFP based on the print data received from the outside.

As described above, the image forming system 10 determines the marker during printing time. However, the image forming system 10 may determine the marker at a time point other than a time point of the printing. For example, in the case of the copying, the image forming system 10 may determine the marker at a time point at which the scanner reads the image.

In the image forming system 10, at least one MFP among the plurality of the MFPs may achieve at least a part of functions of the server 40. When at least one MFP among the plurality of the MFPs achieves all the functions of the server 40, the image forming system 10 does not have to include the server 40. For example, in the image forming system 10, respective MFPs themselves may store document management information and marker management information.

While in the embodiment the image forming system 10 includes an MFP as an image forming apparatus of the disclosure, the image forming system 10 may include an image forming apparatus other than an MFP, such as a printer-only machine and a copy-only machine as the image forming apparatus of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system, comprising:
   a portable terminal device that includes an imaging device and an output device;
   an image forming apparatus that performs printing on a recording medium; and
   a marker registration circuit that registers a marker; wherein
   the image forming apparatus includes
      a discharge unit that discharges a printed recording medium, and
      a display device located corresponding to the discharge unit,
   the image forming apparatus displays the marker associated with location information of a user who has instructed the execution of the printing on the display device located corresponding to the discharge unit that discharges the recording medium,
   the marker registration circuit registers the location information associated with the marker, and
   the portable terminal device includes
      an information acquisition circuit that photographs the marker displayed on the display device using the imaging device, so as to acquire the location information registered in the marker registration circuit, the location information being associated with the marker photographed by the imaging device, and
      a position notification image output circuit that outputs a position notification image that notifies a position corresponding to the location information acquired by the information acquisition circuit to the output device.

2. The image forming system according to claim 1, wherein:
   the marker registration circuit associates a thumbnail of an image printed on the recording medium with the marker and registers the associated thumbnail; and
   the position notification image output circuit includes the thumbnail in the position notification image, the thumbnail being associated with the marker photographed by the imaging device and registered in the marker registration circuit.

3. The image forming system according to claim 1, wherein the portable terminal device combines a position instruction image that instructs a position corresponding to the location information in a photographed image photographed by the imaging device to generate the position notification image.

4. The image forming system according to claim 1, wherein:
   the marker registration circuit associates identification information of the user with the marker and registers the associated identification information;

the information acquisition circuit acquires the location information and the identification information, the location information and the identification information being associated with the marker photographed by the imaging device and registered in the marker registration circuit; and the position notification image output circuit includes the identification information acquired by the information acquisition circuit in the position notification image.

* * * * *